US008566137B1

(12) United States Patent
Cabrera et al.

(10) Patent No.: US 8,566,137 B1
(45) Date of Patent: Oct. 22, 2013

(54) INVENTORY ACROSS MULTIPLE MARKETPLACES

(75) Inventors: Luis Felipe Cabrera, Bellevue, WA (US); Aravind Yalamanchi, Lynnwood, WA (US); Stefan M. Haney, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/053,596

(22) Filed: Mar. 22, 2011

(51) Int. Cl.
*G06Q 10/00* (2012.01)
*G06G 1/14* (2006.01)

(52) U.S. Cl.
USPC .......... 705/7.22; 705/7.12; 705/7.24; 705/22; 705/7.29

(58) Field of Classification Search
None
See application file for complete search history.

(56) References Cited

U.S. PATENT DOCUMENTS

| | | | | |
|---|---|---|---|---|
| 5,237,496 A * | 8/1993 | Kagami et al. | ............... | 705/7.31 |
| 5,953,707 A * | 9/1999 | Huang et al. | ............... | 705/7.25 |
| 6,324,522 B2 * | 11/2001 | Peterson et al. | ............... | 705/28 |
| 6,643,628 B1 * | 11/2003 | Jackson et al. | ............... | 706/25 |
| 6,996,538 B2 * | 2/2006 | Lucas | ............... | 705/28 |
| 7,240,027 B2 * | 7/2007 | McConnell et al. | ............ | 705/28 |
| 7,707,203 B2 * | 4/2010 | Hyder et al. | ............... | 707/710 |
| 8,010,582 B2 * | 8/2011 | Zimowski | ............... | 707/809 |
| 8,104,681 B2 * | 1/2012 | Eisenson | ............... | 235/385 |
| 8,335,722 B2 * | 12/2012 | Lee et al. | ............... | 705/16 |
| 8,392,261 B2 * | 3/2013 | Lee et al. | ............... | 705/22 |
| 2002/0147651 A1 * | 10/2002 | Hoar et al. | ............... | 705/22 |
| 2004/0153459 A1 * | 8/2004 | Whitten et al. | ............... | 707/10 |
| 2004/0243478 A1 * | 12/2004 | Walker et al. | ............... | 705/26 |
| 2005/0075945 A1 * | 4/2005 | Hodge et al. | ............... | 705/26 |
| 2006/0206584 A1 * | 9/2006 | Hyder et al. | ............... | 709/218 |
| 2006/0242192 A1 * | 10/2006 | Musgrove et al. | ............. | 707/102 |
| 2007/0150328 A1 * | 6/2007 | Koide et al. | ............... | 705/8 |
| 2009/0006114 A1 * | 1/2009 | Donovan et al. | ............... | 705/1 |
| 2009/0019148 A1 * | 1/2009 | Britton et al. | ............... | 709/224 |
| 2009/0125411 A1 * | 5/2009 | Otto et al. | ............... | 705/26 |
| 2010/0235250 A1 * | 9/2010 | Bar-Levav | ............... | 705/23 |
| 2011/0050423 A1 * | 3/2011 | Cova et al. | ............... | 340/572.1 |
| 2011/0191255 A1 * | 8/2011 | Sowell | ............... | 705/310 |
| 2012/0016757 A1 * | 1/2012 | Lee et al. | ............... | 705/16 |
| 2012/0089467 A1 * | 4/2012 | Comparelli | ............... | 705/16 |
| 2012/0233170 A1 * | 9/2012 | Musgrove et al. | ............. | 707/740 |
| 2013/0018804 A1 * | 1/2013 | Swinson et al. | ............... | 705/306 |
| 2013/0117067 A1 * | 5/2013 | Sullivan et al. | ............... | 705/7.29 |

FOREIGN PATENT DOCUMENTS

EP 1281142 * 2/2003
WO WO 2006/099299 A2 * 9/2006

OTHER PUBLICATIONS

Gonzalez J. & Gonzalez, D. (2010). Analysis of an Economic Order Quantity and Reorder Point Inventory Control Model for Company XYZ.*
Takahashi, K. et al. (2010). Inventory control in a two-echelon dual-channel supply chain with setup of production and delivery. Int. J. of Production Economics 133, p. 403-415.*

(Continued)

*Primary Examiner* — Matthew Gart
*Assistant Examiner* — Peter L Ludwig
(74) *Attorney, Agent, or Firm* — Thomas | Horstemeyer, LLP

(57) ABSTRACT

Disclosed are various embodiments for determining inventory levels of a multi-channel seller. Order rates can be retrieved from various marketplaces in which a seller participates. An inventory depletion rate can also be determined. A period of uncertain inventory availability can be determined based at least upon an update interval with which order updates are retrieved. Inventory can be reported as unavailable based at least upon an initial quantity of the product, the inventory depletion rate, and whether the period of uncertain inventory availability is entered.

23 Claims, 3 Drawing Sheets

(56) References Cited

OTHER PUBLICATIONS

Huang, S. et al. (2011). Inventory Management in a (Q, r) Inventory Model With Two Demand Classes and Flexible Delivery. Int' J. of Innovative Computing, Information and Control 7(3).*

Klabjan, D. (2009). Economic order quantity for business-to-consumer fulfillment.*

Tsay, A. & Agrawal, N. (2004). Channel conflict and coordination in the e-commerce age. Production and Operations Man. 13(1), p. 93-110.*

Tagy, A. (2009). Managing marketing multi-channel conflict to maximize profit in the Egyptian Consumer Electronics market.*

* cited by examiner

INVENTORY ACROSS MULTIPLE MARKETPLACES

BACKGROUND

Sellers may offer their inventory for sale via multiple marketplaces. In other words, sellers may create sales listings in various marketplaces for a single physical inventory of the seller. These marketplaces may often rely on the updating of inventory levels by the seller. Accordingly, inaccurate inventory level data regarding seller inventory levels can result in processing of an order on behalf of the seller that cannot be fulfilled because the seller inventory has been exhausted, which can degrade a customer experience.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to determining a merchant's inventory levels for which real time or perfect information about the seller's inventory may be unavailable. Merchants, or sellers, may offer products for sale via many electronic marketplaces provided by various electronic commerce sites. These various marketplaces employed by sellers to generate sales can, in some cases, be operated by unrelated entities that do not exchange real time information about sales and/or inventory levels. In prior art systems, as the inventory levels associated with a particular product of a seller are depleted, a risk arises that a marketplace may process an order from a purchaser when there is no available inventory to provide to the purchaser. Therefore, embodiments of the present disclosure can determine likely inventory levels of a seller based at least upon order history, historical order rates, and/or other data regarding sales listings across the various marketplaces in which a seller may offer its inventory for sale. This reduces the likelihood that a marketplace facilitated by an embodiment of this disclosure will process an order from a purchaser when there is no available inventory from the seller's inventory to provide to the purchaser.

Figure 1:
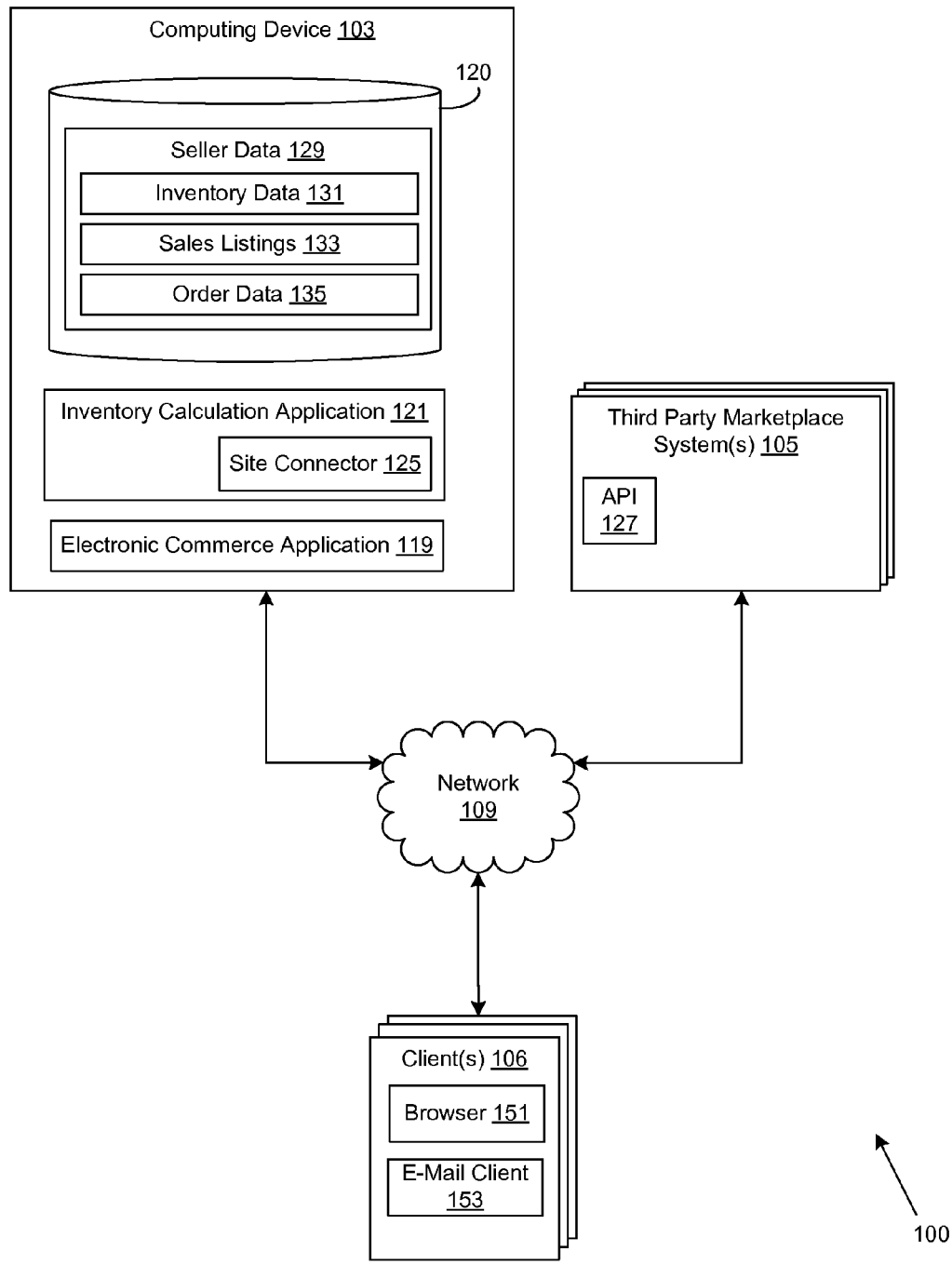
FIG. 1 is a drawing of a networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103, a third party marketplace system 105, and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Additionally, the third party marketplace system 105 can also be implemented in one or more computing devices.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an electronic commerce application 119, an inventory calculation application 121, and other applications, services, processes, systems, engines, or functionality not discussed in detail herein. The electronic commerce application 119 can facilitate an electronic commerce site associated with one or more retailers through which customers can purchase, rent, and/or download products. To this end, the electronic commerce application 119 can process orders on behalf of customers and transmit network pages or other user interface elements that can be rendered on a client 106. Similarly, the electronic commerce application 119 can receive data from a client 106 pertaining to product selections, payment information, and other data necessary to effectuate an electronic commerce site.

The electronic commerce application 119 can also provide a marketplace in which sellers can create sales listings in which products are offered to users. To this end, the electronic commerce application 119 can track sales listings, inventories, orders, and other data on behalf of sellers. Additionally, the electronic commerce application 119 can provide user interfaces in which sellers can manage the various aspects of sales listings, inventory, and other data. The specific functionality and various implementations of an electronic commerce site should be appreciated by a person of ordinary skill in the art, and is not discussed in detail herein.

The inventory calculation application 121 is executed to determine inventory levels of various products that are offered for sellers in a marketplace facilitated by the electronic commerce application 119. In some embodiments, the inventory calculation application 121 can update inventory data in a data store that is associated with sellers. In another embodiment, the inventory calculation application 121 can operate as a service from which the electronic commerce application 119 requests data regarding inventory levels. As noted above, many sellers are multi-channel sellers in that they offer their inventories for sale in various marketplaces, including third party marketplaces outside the control of an operator of the electronic commerce application 119. While information about orders processed via the electronic commerce application 119 may be available, true real time information about the inventory levels of a seller may be unavailable, as orders against a seller's inventory may be placed via a third party marketplace. Therefore, to facilitate a scenario that includes multi-channel sellers where real time information about the seller's inventory is unavailable, or where inventory levels for the various products in the seller's inventory is otherwise not trustworthy, the inventory calculation application 121 can determine when the quantity of products in a seller inventory are reaching critical levels. In this way, the inventory calculation application 121 can reduce the likelihood that the electronic commerce application 119 will process an order for which, in reality, inventory is unavailable due to the imperfect nature of the information about the inventory of a multi-channel seller.

The inventory calculation application 121 can also execute a site connector 125 that can facilitate communication with an application programming interface (API) 127 provided by the third party marketplace system 105. The site connector 125 can facilitate retrieval of information about sales listings, orders, and other available data about the listings and/or inventory of a seller from a third party marketplace site. In some embodiments, a third party marketplace system 105 can provide an API through which the site connector 125 can retrieve information about sales listings, order history, inventory, or other information related to a seller's inventory and/or listings in a marketplace facilitated by the third party marketplace system 105. In other embodiments, the site connector 125 can extract, or "scrape", content from web pages, network pages, or other user interfaces generated by the third party marketplace system 105 in which information about inventory and/or sales listings is provided. In some embodiments, the third party marketplace system 105 can push inventory and/or sales listing data associated with a seller to the site connector 125.

In some embodiments, the functionality of the inventory calculation application 121 and/or site connector 125 may be included in the electronic commerce application 119. In other embodiments, the inventory calculation application 121 and/or site connector 125 may be executed as a sub-module of the electronic commerce application 119, or as a separate, standalone application, etc. It should be understood that the depicted embodiment of an electronic commerce application 119, inventory calculation application 121 and/or site connector 125 is but one example.

Also stored within the computing device 103 or otherwise accessible to the computing device 103 is a data store 120. The data store 120 may comprise, for example, a database or other type of data storage system. Stored within the data store 120 is seller data 129 as well as other data that can facilitate the functionality of the electronic commerce application 119 and/or inventory calculation application 121. The seller data 129 can include information about sellers participating in a marketplace facilitated by the electronic commerce application 119. To this end, the seller data 129 can include account information related to a seller account that is necessary to facilitate the creation of sales listings, processing of orders, inventory management, and other functions related to this purpose.

In the depicted example, the seller data 129 can include inventory data 131 that contains information about inventory levels of various products that may be offered for sale by a seller via the electronic commerce application 119. Inventory data 131 can include information about various products, such as product identifiers, keywords, model number, or any other similar information. Additionally, the inventory data 131 can include a quantity associated with each of the products in a seller inventory. Inventory levels can be specified by a seller via a user interface provided by the electronic commerce application 119 and/or inventory calculation application 121. For example, a seller can specify inventory levels of products that are associated with a single physical inventory from which orders across various marketplaces are drawn. The data store 120 can also include sales listings 133 associated with a seller account. Sales listings 133 can include information that is associated with listings created by various sellers that offer a particular product for sale to users of the electronic commerce application 119. Sales listings 133 can include pricing data for a product, shipping costs, and other terms that can be associated with a sales listing in a marketplace facilitated by the electronic commerce application 119. Seller data 129 can also include data about orders 135 associated with the various sellers participating in the marketplace. In other words, the orders 135 can comprise an order history associated with the seller.

In some embodiments, the electronic commerce application 119 can provide a user interface to a seller on a client device with which the seller can create, update, and/or modify the various information about inventory, sales listings, and/or orders. Additionally, the electronic commerce application 119 can create and/or modify various information about sellers stored in the seller data 129. For example, the electronic commerce application 119 can process an order from a purchaser that is related to a sales listing of the seller. Accordingly, the electronic commerce application 119 can generate an entry in an order history associated with the seller as well as update inventory data 131 and listing data 133. As is described below, the inventory calculation application 121 can determine inventory levels of a seller from the various information in the data store 120 as well as data retrieved from third party marketplaces about sales listings associated with the seller.

The third party marketplace system 105 can include one or more computing devices that represent third party marketplaces in which a seller may create sales listings from which users may submit orders. Third party marketplaces can include other electronic commerce sites, auction sites, liquidation sites, or any type of marketplace where the seller can sell various products. In one embodiment, fulfillment of orders via the various marketplaces in which a seller participates can be drawn against a single physical inventory of the seller. As noted above, a third party marketplace system 105 may provide an API 127 with which the site connector 125 can interact to retrieve information about orders, sales listings, and other data about a particular seller. It should be appreciated that not all third party marketplace systems 105 may provide such an API 127, and that the depicted example third party marketplace system 105 is but one example. In some examples, an operator of a third party marketplace system 105 may not provide any means with which data about a seller can be retrieved. In some cases, a third party marketplace may actively block access to data about sellers. In other embodiments, a third party marketplace system 105 and the site connector 125 can communicate via electronic data interchange messages or other methods to communicate seller data as can be appreciated.

The client 106 is representative of a plurality of client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 106 may be configured to execute various applications such as a browser 151 and/or other applications. The browser 151 may be executed in a client 106, for example, to access and render network pages, such as web pages, or other network content served up by the inventory calculation application 121, the electronic commerce application 119 and/or other systems. In some embodiments, the client 106 can execute an e-mail client 153 with which a user (e.g., a seller) can send and/or receive electronic mail. It should be appreciated that a user may also interact with electronic mail services via the browser 151 as well. A client can also be configured to execute a special purpose application, such as a mobile application, which may include client side code that renders a user interface that includes data provided by another system.

Next, a general description of the operation of the various components of the networked environment 100 is provided. As noted above, the inventory calculation application 121 can determine current inventory levels as well as an expected inventory level associated with a seller by analyzing data related to inventory and/or orders processed by the electronic commerce application 119 as well as via third party marketplaces. The inventory calculation application 121 can reduce the likelihood that the electronic commerce application 119 processes an order for which the seller does not possess an adequate inventory. Such a scenario is a risk with multi-channel sellers that may participate in a marketplace facilitated by the electronic commerce application 119 as well as one or more third party marketplaces. In one embodiment, the inventory calculation application 121 can interact with the data in the data store 120 regarding a seller's listings in a marketplace facilitated by the electronic commerce application 119, from which the inventory calculation application 121 can deduce changes in a seller inventory on a substantially real time basis. In one example, the electronic commerce application 119 can update a seller inventory 131 when an order is processed.

However, the inventory calculation application 121 may not possess real time order and/or inventory information that is related to transactions processed by third party marketplaces. Accordingly, the inventory calculation application 121 can track historical order rates as well as inventory levels associated with the seller to determine when the inventory level of a particular product associated with a sales listing of a seller reaches a level at which additional orders should not be processed by the electronic commerce application 119. Accordingly, to facilitate such a process for a multi-channel seller, the inventory calculation application 121 can gather additional information about the seller's orders and/or sales listings in various third party marketplaces and, in combination with data known about the seller's listings in the data store 120, detect when an inventory level associated with the seller's inventory reaches critical levels.

To this end, the inventory calculation application 121 can, via the site connector 125, communicate with various third party marketplace systems 105 to determine information about the seller's listings in various third party marketplaces. In the event that a particular third party marketplace system 105 provides an API 127 with which the site connector 125 can interact and retrieve sales listing data as well as information about orders processed by the third party marketplace without API polling or frequency restrictions, the inventory calculation application 121 can so proceed and update inventory data 131 accordingly. In other words, the inventory calculation application 121 can monitor sales listings in a third party marketplace and update inventory data 131 when an order for a sales listing is processed by the third party marketplace system 105.

In some third party marketplaces, an API rate limit may restrict the frequency with which the inventory calculation application 121 can retrieve order data from a respective third party marketplace system 105. Accordingly, the inventory calculation application 121 can poll the API 127 of the third party marketplace system 105 up to such a rate limit, and update the inventory data 131 with information about orders on a periodic basis. In other third party marketplaces, there may be no API with which the inventory calculation application 121 can interact to retrieve order information related to sales listings of a seller. Accordingly, the inventory calculation application 121 may interact with a third party marketplace user interface as a seller would and extract, or "scrape" information about orders from the user interface provided by the third party marketplace system 105.

As one example, the inventory calculation application 121 can, on a periodic basis, utilize a seller's authentication credentials to retrieve an order management page(s) or other user interface from a third party marketplace system 105 and extract information about the orders processed by the third party marketplace on behalf of the seller during a given period of time (e.g., since the last point in time that the inventory calculation application 121 retrieved information from the third party marketplace system 105). In some cases, the inventory calculation application 121 can receive inventory updates from a seller via a user interface provided by the electronic commerce application 119 via a client 106. In other cases, the inventory calculation application 121 can receive order confirmations related to orders for a particular product in a seller inventory by electronic mail. In other words, the inventory calculation application 121 can retrieve information about orders related to substantially all of a seller's orders through the various means permitted by the various third party marketplace systems 105 and/or the seller. The inventory calculation application 121 can also monitor the order rate of a seller related to orders processed by the electronic commerce application 119.

The inventory calculation application 121 can then calculate an order rate associated with the various products in a seller inventory, from which an inventory depletion rate can be determined. Given an initial quantity level provided by the seller for a particular product, the inventory calculation application 121 can then determine when a quantity of a product in a seller inventory reaches a level at which the electronic commerce application 119 should cease processing orders for the product and/or report the inventory as unavailable to reduce the risk of processing an order that the seller may be unable to fulfill because the inventory is exhausted. Accordingly, given a base quantity of a particular product in a seller inventory, to determine an inventory depletion rate associated with the product, the inventory calculation application 121 can calculate one or more order rates associated with the seller's sales listings across the various marketplaces in which the seller participates, including third party marketplaces as well as via the electronic commerce application 119.

It should be appreciated that the update interval for the various marketplaces can vary. In the case of an API 127 provided by third party marketplace systems 105, API rate limits can vary. In the case of inventory updates manually provided by the seller, these updates may be received at irregular intervals. In the case where the inventory calculation application 121 retrieves orders and/or an order history associated with the seller's listings in various third party marketplaces by scraping network pages provided by the marketplaces, the frequency of these updates can vary based upon the network and/or computational resources associated with the computing device 103. Accordingly, the inventory calculation application 121 can calculate and/or maintain multiple update intervals that are associated with the various marketplaces in which a seller participates. In one embodiment, the inventory calculation application 121 can calculate an average update interval associated with the various marketplaces. The update interval can be configured by an operator of the computing device 103 for other various reasons as can be appreciated.

Accordingly, upon calculation of one or more order rates associated with the product across various marketplaces, the inventory calculation application 121 can determine an aggregate order rate from which an inventory depletion rate associated with the seller's inventory of the product can be calculated. As one illustrative non-limiting example, assume that on a first day a seller designates a base quantity of a product at one hundred. Next, assume that the inventory calculation application 121, based on historical order updates related to the product across all marketplaces in which the seller participates, retrieved order data from the various marketplaces at an update interval of once per day. Assume also that the inventory calculation application 121 has determined that the order rate associated with the seller and with the product reveals an order rate of ten units per day. In one embodiment, the inventory calculation application 121 can be configured to analyze a configurable moving time window of any size of historical order data associated with the seller (e.g., the previous five days, six months, etc.). In the above example, if the inventory calculation application 121 can determine, from an order history across all marketplaces from the previous five days that the seller has sold ten units of the product per day, then the inventory depletion rate for the product can likewise be calculated as ten per day for the product for the seller. Therefore, after five days, the inventory calculation application 121 can appropriately update the inventory data 131 associated with the seller and product.

Continuing the above example, prior to the tenth day (e.g., on the second day), the inventory calculation application 121 can determine that there is little risk of processing an order that cannot be fulfilled by the seller because the inventory depletion rate, combined with the base quantity designated by the seller, does not reflect that inventory levels are dangerously low. However, on the tenth day, the inventory calculation application 121 can determine that inventory levels are reaching a level at which there is a risk that the electronic commerce application 119 may process an order that cannot be fulfilled by the seller. Accordingly, the inventory calculation application 121 can proactively make assumptions about inventory levels of the seller to reduce this risk.

In other words, the inventory calculation application 121 can extrapolate the inventory depletion rate for the product over a period of uncertain inventory availability. In some embodiments, the period of uncertain inventory availability can be based upon an average update interval associated with the order updates from which an inventory depletion rate is calculated. For example, in the context of the above example, assuming an average update interval of once per day, the period of uncertain inventory availability during which the inventory calculation application 121 can extrapolate can be a configurable unit of time that is based upon the update interval. As one illustration, the inventory calculation application 121 can be configured to define a period of uncertain inventory availability at twice the average update interval.

In the context of the above example, the inventory calculation application 121 can determine, after ten percent of the tenth day has passed, that ten percent of the remaining inventory of the product has been depleted. Similarly, the inventory calculation application 121 can determine, after eighty percent of the tenth day has passed, that eighty percent of the remaining inventory has been depleted. Accordingly, the inventory calculation application 121 can update the inventory data 131 associated with the seller during the period of uncertain inventory availability even though it cannot be definitively determined that the seller's inventory has been depleted during this period. In some embodiments, the inventory calculation application 121 can be configured to update the inventory data 131 so that that the electronic commerce application 119 does not process orders for the product when the assumed inventory level approaches within a configurable threshold of depletion.

In some embodiments, the inventory calculation application 121 can consider other external factors in addition to the inventory depletion rate and update intervals to determine whether a product in a seller inventory is at risk of being unavailable. For example, the inventory calculation application 121 can adjust the calculated inventory depletion rate based on the time of day. In one example, the inventory calculation application 121 can determine that a marketplace facilitated by the electronic commerce application 119 processes fewer orders between certain off peak hours of the day. Therefore, the inventory calculation application 121 can reduce the calculated inventory depletion rate during off peak hours of the day, and increase the rate during peak hours of the day. As another example, the inventory calculation application 121 can adjust the inventory depletion rate when making a determination regarding whether inventory is available based upon seasonal shopping conditions. For example, the inventory calculation application 121 can increase the inventory depletion rate calculated based upon historical order rates during a holiday shopping season. The inventory calculation application 121 can make these adjustments based at least upon factors known about a historical or projected product, product category and/or marketplace.

As some examples, the inventory calculation application 121 can adjust an inventory depletion rate based upon a historical order rate associated with an entire marketplace at a given time of day, season, etc. In this example, the inventory calculation application 121 can determine that a marketplace, as a whole, may be busier during certain times of a day and have a higher aggregate order rate during certain peak hours. As one non-limiting example, a marketplace may, as a whole, process 20% more orders during a given time window relative to a remainder of the day. Accordingly, the inventory calculation application 121 can adjust the inventory depletion rate by this percentage during this time window when determining whether inventory should be reported as unavailable. As another example, the inventory calculation application can adjust an inventory depletion rate based upon a historical order rate associated with a product category to which the product is assigned.

It should be appreciated that the update intervals associated with various third party marketplaces can vary because of API rate limits, the frequency with which a seller provides order updates related to sales via third party marketplaces, and other factors as can be appreciated. Additionally, the sales volume and/or order rate for a particular product can also vary among various marketplaces. Therefore, the inventory calculation application 121 can take into account these varying update intervals and/or order rates to determine an aggregate inventory depletion rate based upon an order rate in the various marketplaces, which can be associated with the seller's inventory of various products associated with its various sales listings.

For example, the inventory calculation application 121 may be able to determine that a seller's order rate for a product in a first marketplace is one unit per hour, and in a second marketplace, it may determine that the order rate is one unit per day, and so on. Accordingly, the inventory calculation application 121 can calculate an aggregate order rate across the various marketplaces in which the seller participates, from which an aggregate inventory depletion rate can be determined. Similarly, the inventory calculation application 121 can determine one or more update intervals associated with the various third party marketplaces from which a period of uncertain inventory availability can be determined.

It should be appreciated that a seller may add additional quantities to an inventory of a particular product, and the seller can accordingly update the seller inventory 131 stored in the data store 120 via a user interface provided by the electronic commerce application 119 and/or inventory calculation application 121. Adding inventory to a seller inventory 131 may not affect an order rate across the various marketplaces in which a seller participates. However, the addition of inventory 131 may affect the overall inventory level and thus the determination of when a seller inventory of a product approaches a period of uncertain inventory availability as the inventory is replenished.

The behavior of the inventory calculation application 121 can be configured in various ways based upon many variables. In one embodiment, the inventory calculation application 121 can be configured with varying degrees of aggressiveness in making inventory depletion rate determinations during the period of uncertain inventory availability. For example, the inventory calculation application 121 can be configured to update the seller inventory 131 information in the data store 120, report an inventory quantity to the electronic commerce application 119 based upon a determined expected inventory level as described above, and/or prevent the electronic commerce application 119 from processing orders against a seller inventory once the seller inventory 131 reaches the period of uncertain inventory availability. As another example, the inventory calculation application 121 can be configured to allow orders to be processed by the electronic commerce application 119 against the seller inventory until a configurable percentage of the period has passed.

The inventory calculation application 121 can be configured in this way based at least upon various factors about the seller. For example, for orders for sellers with a history of positive user feedback, the inventory calculation application 121 can be configured to allow the electronic commerce application 119 to process orders well into the period of uncertain inventory availability. For new sellers, sellers having negative user feedback, and/or sellers for which little user feedback is known, the inventory calculation application 121 can be configured to cause order processing associated with a particular product inventory to be ceased earlier in the period of uncertain inventory availability.

In some embodiments, the inventory calculation application 121 can be configured to more aggressively decrement expected inventory levels during the period of uncertain inventory availability as the inventory is available in more marketplaces. In other embodiments, the inventory calculation application 121 can be configured to more aggressively decrement expected inventory levels during the period of uncertain inventory availability on a seasonal basis. For example, the inventory calculation application 121 can modify or adjust a calculated inventory depletion rate if a busy shopping season commences or any other event with which an affect on the inventory depletion rate can be associated.

Figure 2:
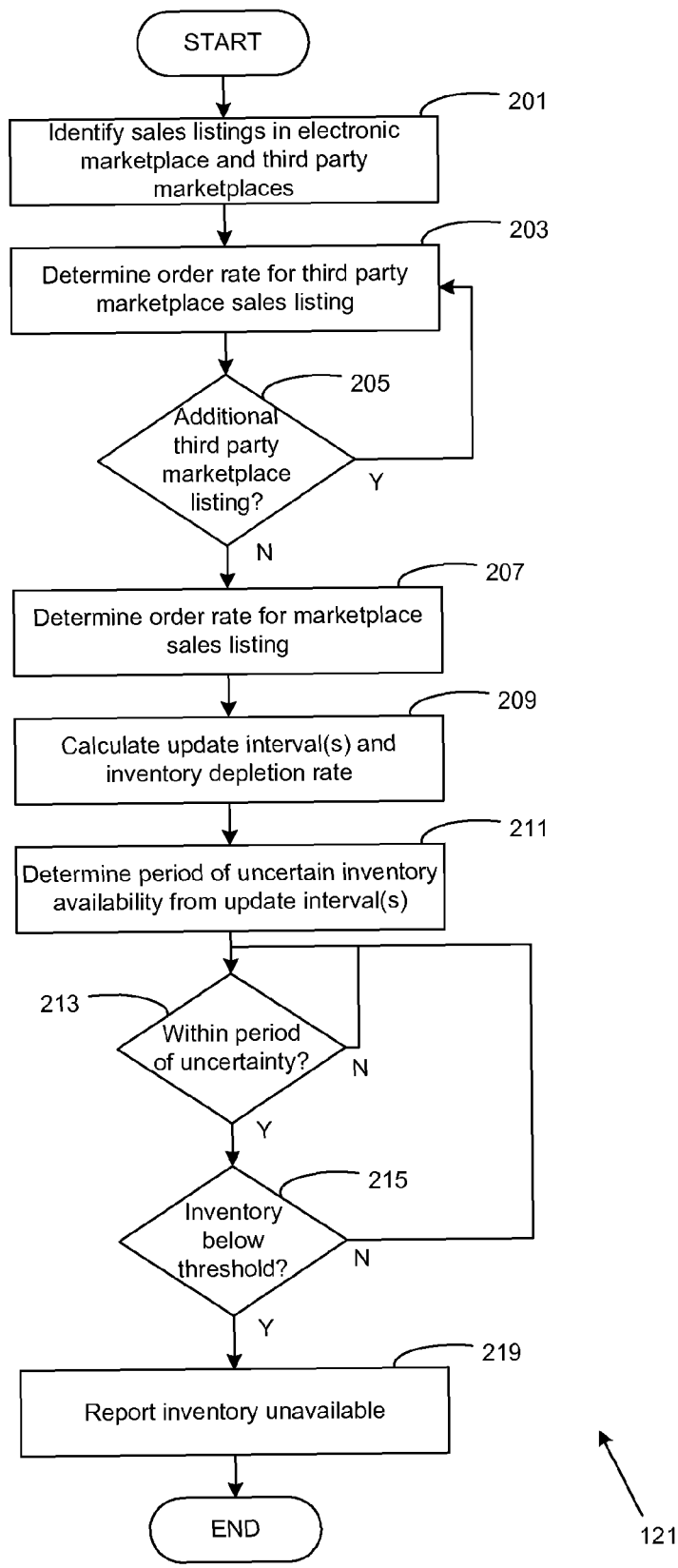
FIG. 2 is a flowchart illustrating one example of functionality implemented as portions of the networked environment executed in a computing device in the networked environment of FIG. 1 according to various embodiments of the present disclosure.

Referring next to FIG. 2, shown is a flowchart that provides one example of the operation of a portion of the inventory calculation application 121 according to various embodiments. It is understood that the flowchart of FIG. 2 provides merely an example of the many different types of functional arrangements that may be employed to implement the operation of the portion of the inventory calculation application 121 as described herein. As an alternative, the flowchart of FIG. 2 may be viewed as depicting an example of steps of a method implemented in the computing device 103 (FIG. 1) according to one or more embodiments.

Beginning with box 201, the inventory calculation application 121 can identify sales listings in a marketplace facilitated by the electronic commerce application 119 (FIG. 1) for a particular product associated with a seller inventory. Additionally, at least one sales listing in a third party marketplace that is also associated with the product and the seller inventory can be identified. In some embodiments, a seller can, via a user interface provided by the electronic commerce application 119 and/or inventory calculation application 121, identify various marketplaces in which a seller inventory is available via sales listings for various products. Accordingly, in box 203, the inventory calculation application 121 determines an order rate associated with a third party marketplace sales listing. As noted above, the frequency with which the inventory calculation application 121 can obtain updates regarding order information to determine an order rate may vary based upon the varying ways in which order updates from various marketplaces are provided to the inventory calculation application 121. In box 205, the inventory calculation application 121 can determine whether there are additional third party marketplaces that are associated with the product as well as the seller inventory and calculate an order rate accordingly.

In box 207, the inventory calculation application 121 determines an order rate for the sales listing for the product in a marketplace facilitated by the electronic commerce application 119. As noted above, in such a scenario, the inventory calculation application 121 can obtain order information from the data store 120 (FIG. 1) or any other mechanism provided by the marketplace from which the inventory calculation application 121 can obtain order data. In one example, an inventory depletion rate associated with the seller inventory and the product can be based at least upon average order rate over a given unit of time. In box 209, the inventory calculation application 121 can calculate one or more update intervals associated with the frequency with which the inventory calculation application 121 can obtain updates regarding order information from the various marketplaces in which the seller participates. In one example, the inventory calculation application 121 can calculate an average update interval associated with the various marketplaces. In box 211, the inventory calculation application 121 can determine a period of uncertain inventory availability based at least upon the update intervals. In some embodiments, this period can be a multiple of an average update interval.

In box 213, the inventory calculation application 121 determines, based at least upon the inventory depletion rate of a product and a quantity associated with the product, whether the inventory levels are within the period of uncertainty. If so, the inventory calculation application 121 can determine whether inventory levels are below a certain threshold that can be specified by an operator of the inventory calculation application 121. As described above, the inventory calculation application 121 can, in some embodiments, adjust a calculated inventory depletion rate based upon external factors such as time of day and other factors discussed above. For example, in box 215, the inventory calculation application 121 can be configured to determine whether expected inventory levels are below a user specified threshold, and if so, in box 219, the inventory calculation application 121 can report that inventory of the product is unavailable. If inventory levels are not below the threshold, the inventory calculation application 121 can continue to monitor the inventory depletion rate, order rates, and an expected quantity of the product.

Figure 3:
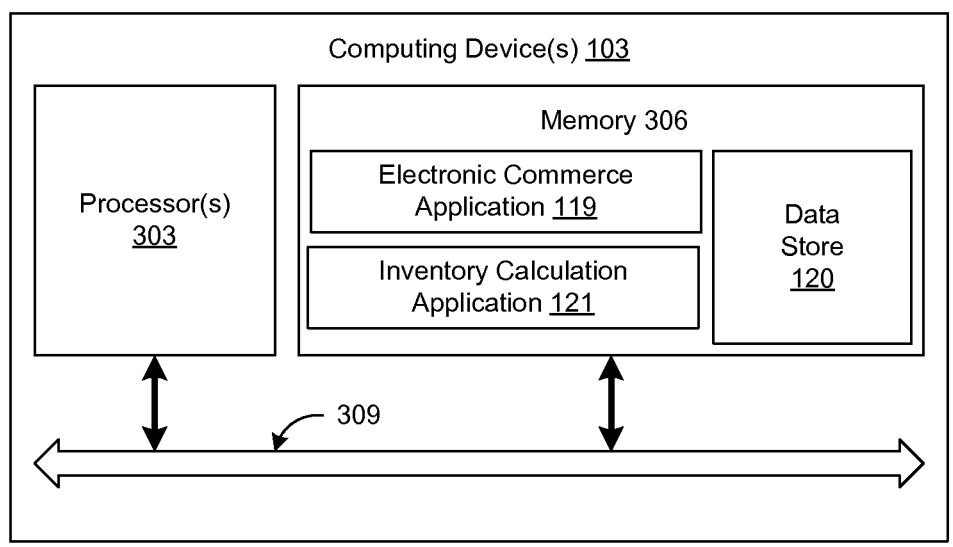
FIG. 3 is a schematic block diagram that provides one example illustration of a computing device employed in the networked environment of FIG. 1 according to various embodiments of the present disclosure.

With reference to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the electronic commerce application 119, the inventory calculation application 121, and potentially other applications. Also stored in the memory 306 may be a data store 120 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 109 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the inventory calculation application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the inventory calculation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including in the inventory calculation application 121, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    an inventory calculation application executable in the at least one computing device, the inventory calculation application configured to cause the at least one computing device to:
        identify a sales listing in an electronic commerce site in which a product is offered for sale on behalf of a seller, the sales listing associated with a seller inventory of the product;
        identify at least one third party marketplace sales listing in at least one third party electronic commerce site in which the product is offered for sale, wherein the at least one third party marketplace sales listing is identified by scraping the at least one third party electronic commerce site via the at least one computing device, the at least one third party marketplace sales listing associated with the seller inventory of the product;
        calculate at least one order rate based at least upon data identified from the sales listing and the at least one third party marketplace sales listing, wherein the at least one order rate is associated with to the product offered for sale via the electronic commerce site and the at least one third party electronic commerce site;
        calculate an inventory depletion rate associated with the seller inventory of the product based at least upon the at least one order rate; and
        update a quantity of the seller inventory of the product associated with the product in the seller inventory based at least upon the inventory depletion rate associated with the sales listing and with the at least one third party marketplace sales listing.

2. The system of claim 1, wherein the inventory calculation application is further configured to cause the at least one computing device to:
    retrieve an order history associated with the sales listing over a first interval;
    retrieve another order history associated with each of the at least one third party marketplace sales listings over the first interval; and
    calculate a number of orders in the electronic commerce site and in the at least one third party commerce site over an update interval, the number of orders over the update interval being designated as the order rate.

3. The system of claim 1, wherein the inventory calculation application is further configured to cause the at least one computing device to adjust the inventory depletion rate based at least upon at least one of: a time of day, seasonal conditions, or an aggregate order rate associated with the electronic commerce site.

4. The system of claim 1, wherein the inventory calculation application is further configured to cause the at least one computing device to determine a period of uncertain inventory availability based at least upon an update interval.

5. The system of claim 4, wherein the inventory calculation application is further configured to cause the at least one computing device to determine whether the uncertain inventory availability period has been reached by determining, based at least upon the quantity associated with the product in the seller inventory and the inventory depletion rate, whether the quantity is below a threshold.

6. The system of claim 5, wherein the inventory calculation application is further configured to cause the at least one computing device to report the product as unavailable in the seller inventory during the period of uncertain inventory availability.

7. The system of claim 6, wherein the inventory calculation application is further configured to cause the at least one computing device to:
    extrapolate the inventory depletion rate over a remaining quantity of the seller inventory of the product;
    generate a projected time expressing a projection of when the seller inventory of the product will be depleted; and
    report the product as unavailable in the seller inventory when the projected time is reached.

8. The system of claim 1, wherein the inventory calculation application is further configured to identify at least one third party marketplace sales listing in at least one third party commerce site further comprises logic that receives at least one sales listing communication from a seller, the at least one sales listing communication comprising data about the at least third party marketplace sales listing in the at least one third party commerce site.

9. The system of claim 8, wherein the at least one sales listing communication further comprises an electronic mail message comprising at least one order confirmation from the at least one third party commerce site.

10. The system of claim 1, wherein the inventory calculation application is further configured to cause the at least one computing device to communicate with an application programming interface (API) associated with the at least one third party commerce site, the API configured to provide access to sales listings associated with the seller.

11. The system of claim 1, wherein the inventory calculation application is further configured to cause the at least one computing device to determine a number of orders processed in the electronic commerce site and the at least one third party commerce site over a specified time period.

12. A method comprising:
identifying, via at least one computing device, a sales listing in an electronic commerce site in which a product is offered for sale on behalf of a seller, the sales listing associated with a seller inventory of the product;
identifying, via the at least one computing device, at least one third party marketplace sales listing in at least one third party electronic commerce site in which the product is offered for sale, wherein the at least one third party marketplace sales listing is identified by scraping the at least one third party electronic commerce site via the at least one computing device, the at least one third party marketplace sales listing associated with the seller inventory of the product;
calculate, via the at least one computing device, at least one order rate based at least upon data identified from the sales listing and the at least one third party marketplace sales listing, wherein the at least one order rate is associated with to the product offered for sale via the electronic commerce site and the at least one third party electronic commerce site;
calculating, via the at least one computing device, an inventory depletion rate associated with the seller inventory of the product based at least upon the at least one order rate; and
updating, via the at least one computing device, a quantity of the seller inventory of the product associated with the product in the seller inventory based at least upon the inventory depletion rate associated with the sales listing and with the at least one third party marketplace sales listing.

13. The method of claim 12, wherein determining the order rate further comprises:
retrieving, via the at least one computing device, an order history associated with the sales listing over a first interval;
retrieving, via the at least one computing device, another order history associated with each of the at least one third party marketplace sales listings over the first interval; and
calculating, via the at least one computing device, a number of orders in the electronic commerce site and in the at least one third party commerce site over an update interval, the number of orders over the update interval being designated as the order rate.

14. The method of claim 12, further comprising adjusting, via the at least one computing device, the inventory depletion rate based at least upon at least one of: a time of day, seasonal conditions, or an aggregate order rate associated with the electronic commerce site.

15. The method of claim 13, further comprising determining, via the at least one computing device, a period of uncertain inventory availability based at least upon the update interval.

16. The method of claim 15, further comprising determining, via the at least one computing device, whether the uncertain inventory availability period has been reached by determining, based at least upon the quantity associated with the product in the seller inventory and the inventory depletion rate, whether the quantity is below a threshold.

17. The method of claim 16, wherein the at least one sales listing communication further comprises an electronic mail message comprising at least one order confirmation from the at least one third party commerce site.

18. The method of claim 17, wherein reporting the product as unavailable in the seller inventory during the period of uncertain inventory availability further comprises:
extrapolating, via the at least one computing device, the inventory depletion rate over a remaining quantity of the seller inventory of the product;
generating, via the at least one computing device, a projected time expressing a projection of when the seller inventory of the product will be depleted; and
reporting, via the at least one computing device, the product as unavailable in the seller inventory when the projected time is reached.

19. The method of claim 12, wherein identifying at least one third party marketplace sales listing in at least one third party commerce site further comprises the step of receiving, via the at least one computing device, at least one sales listing communication from a seller, the at least one sales listing communication comprising data about the at least third party marketplace sales listing in the at least one third party commerce site.

20. The method of claim 19, wherein the at least one sales listing communication further comprises an electronic mail message comprising at least one order confirmation from the at least one third party commerce site.

21. The method of claim 12, wherein identifying at least one third party marketplace sales listing in at least one third party commerce site further comprises the step of communicating, via the at least one computing device, with an application programming interface (API) associated with the at least one third party commerce site, the API configured to provide access to sales listings associated with the seller.

22. The method of claim 12, wherein determining the order rate further comprises the step of determining a number of orders processed in the marketplace and the at least one third party commerce site over a specified time period.

23. A non-transitory computer-readable medium embodying a program executable in a computing device, the program, when executed, causing the computing device to:
identify a sales listing in an electronic commerce site in which a product is offered for sale on behalf of a seller, the sales listing associated with a seller inventory of the product;
identify at least one third party marketplace sales listing in at least one third party electronic commerce site in which the product is offered for sale, wherein the at least one third party marketplace sales listing is identified by scraping the at least one third party electronic commerce site via the computing device, the at least one third party marketplace sales listing associated with the seller inventory of the product;
calculate at least one order based at least upon data identified from the sales listing and the at least one third party marketplace sales listing, wherein the at least one order rate is associated with to the product offered for sale via the electronic commerce site and the at least one third party electronic commerce site;
calculate an inventory depletion rate associated with the seller inventory of the product based at least upon the at least one order rate; and
update a quantity of the seller inventory of the product associated with the product in the seller inventory based at least upon the inventory depletion rate associated with the sales listing and with the at least one third party marketplace sales listing.

* * * * *

UNITED STATES PATENT AND TRADEMARK OFFICE
CERTIFICATE OF CORRECTION

PATENT NO. : 8,566,137 B1
APPLICATION NO. : 13/053596
DATED : October 22, 2013
INVENTOR(S) : Luis Felipe Cabrera et al.

Page 1 of 1

It is certified that error appears in the above-identified patent and that said Letters Patent is hereby corrected as shown below:

In the Claims

Claim 1, column 13, line 65, delete the word "to";

Claim 23, column 16, line 52, add the word "rate" after the word "order".

Signed and Sealed this
Seventh Day of October, 2014

Michelle K. Lee
*Deputy Director of the United States Patent and Trademark Office*